United States Patent [19]

Swain et al.

[11] Patent Number: 5,418,349

[45] Date of Patent: * May 23, 1995

[54] PROCESS FOR REDUCING THICKNESS OF A POLYMERIC PHOTOCONDUCTIVE COATING ON A PHOTORECEPTOR WITH LASER

[75] Inventors: Eugene A. Swain, Webster; Stanley J. Pietrzykowski; Alfred O. Klein, both of Rochester, all of N.Y.

[73] Assignee: Xerox Corporation, Stamford, Conn.

[*] Notice: The portion of the term of this patent subsequent to Apr. 4, 2012 has been disclaimed.

[21] Appl. No.: 71,089

[22] Filed: Jun. 4, 1993

[51] Int. Cl.$^6$ .................... B23K 26/14; B08B 7/04
[52] U.S. Cl. .................... 219/121.84; 134/1; 134/21; 134/32; 427/555; 427/556
[58] Field of Search .............. 134/1, 32, 21; 427/555, 427/556; 219/121.84, 121.68, 121.69

[56] References Cited

U.S. PATENT DOCUMENTS

| | | | |
|---|---|---|---|
| 3,659,332 | 5/1972 | Morrone | 134/1 |
| 3,749,878 | 7/1973 | Sullivan et al. | 219/121.67 |
| 4,151,312 | 4/1979 | Compen | 427/64 |
| 4,491,463 | 1/1985 | Weinstein et al. | 134/1 |
| 4,498,917 | 2/1985 | Weinstein et al. | 134/1 |
| 4,530,896 | 7/1985 | Christensen et al. | 430/155 |
| 4,685,975 | 8/1987 | Kottman et al. | 134/33 |
| 4,716,829 | 1/1988 | Wenzel | 101/426 |
| 4,739,591 | 4/1988 | Everhardus et al. | 51/319 |
| 4,776,904 | 10/1988 | Charlton et al. | 156/73.1 |
| 4,786,358 | 11/1988 | Yamazaki et al. | 427/555 |
| 4,898,650 | 2/1990 | Wu et al. | 204/29 |
| 5,064,685 | 11/1991 | Kestenbaum et al. | 427/556 |
| 5,164,567 | 11/1992 | Gettemy | 219/121.72 |
| 5,187,967 | 2/1993 | Singh et al. | 72/340 |
| 5,199,342 | 4/1993 | Hediger | 83/177 |

FOREIGN PATENT DOCUMENTS 3-144458 6/1991 Japan.
3194131 2/1993 Japan.

OTHER PUBLICATIONS

Markstein, "Lasers Fine Tune Thick Film Hybrids", *Electronic Packaging & Production*, vol. 30, No. 11, Nov. 1990, pp. 58–61.
Brannon et al., *IEEE Circuits and Devices*, vol. 6, No. 5, Sep. 1990, pp. 19–24.
Patent Abstracts of Japan, 61-165287, vol. 10, No. 372, Dec. 1986.
JP-A-01 059 232 Abstract, Database WPI, Week 8915.

*Primary Examiner*—David A. Simmons
*Assistant Examiner*—Saeed Chaudhry
*Attorney, Agent, or Firm*—Oliff & Berridge

[57] ABSTRACT

A process for treating a coated substrate to reduce the thickness of the coating involves directing a laser beam at a predetermined surface portion of the substrate to remove part of the coating. The process can be used to treat a coated photoreceptor to precisely reduce the thickness of the coating in a predetermined region.

19 Claims, 4 Drawing Sheets

PROCESS FOR REDUCING THICKNESS OF A POLYMERIC PHOTOCONDUCTIVE COATING ON A PHOTORECEPTOR WITH LASER

BACKGROUND OF THE INVENTION

The present invention relates to processes for treating substrate surfaces, and particularly to a process for removing part of a coating from a substrate using laser irradiation.

In the manufacture of coated substrates such as layered photoreceptors, it is often desirable to uniformly reduce the thickness of a coating in a predetermined region. For example, in producing coated photoreceptors, it is frequently necessary to reduce the thickness of the photoreceptor's seams, taper or seal edges of the photoreceptor, or remove excess material in the "sag" area of a dip-coated photoreceptor drum. Sag areas are regions of thicker coating formed when wet coating material migrates down the side of a dip-coated drum as the drum is lifted out of a coating bath.

Conventionally, coated substrate surfaces are treated to remove excess coating material by applying chemical solvents or by mechanically machining the substrate surface. However, chemical or mechanical treatments often do not provide the treated substrate with a sufficiently uniform and smoothly polished surface suitable for certain commercial uses such as the manufacture of photoreceptors. Chemical treatments can cause solvent droplets or vapor to contact the coating in regions that are not intended to be removed, reducing the quality of the photoreceptor. Furthermore, organic solvents have a limited useful life and are hazardous to work with. Mechanical machining techniques for removing coatings are cumbersome, inefficient, and often produce photoreceptors of unacceptable quality. Moreover, chemical or mechanical treatments do not achieve precise tolerances, which renders such processes unsuitable for reducing the thickness of a coating such as a polymer coating on a predetermined surface region of the substrate.

Japanese Publication No. 3-144,458 discloses an attempt to eliminate mechanical and chemical treatments of coated photoreceptors. A laser beam from an yttrium-aluminum-garnet laser is irradiated at the end portions of a photoreceptor drum to burn or sublimate the photoreceptor coating. Japanese Publication No. 3-194,131 discloses a similar process in which laser energy is directed at the ends of a photoreceptor in an effort to completely remove the coating.

Although these laser treatment processes are intended to completely remove a photoreceptor coating, it has been found that many materials commonly used in photoreceptor coatings are melted, rather than vaporized, by these processes. The molten coating subsequently hardens and must be removed by chemical or mechanical means. Moreover, in some instances it is desirable to uniformly remove only part of the coating, rather than completely vaporize and/or melt the entire coating.

SUMMARY OF THE INVENTION

The invention provides a process for treating a coated substrate to reduce the thickness of the coating by directing a laser beam at a predetermined surface portion of the substrate to remove part of the coating from the predetermined surface portion. This process will be referred to as "laser machining." The process of the invention uniformly reduces the thickness of a coating on a substrate and can produce a smooth and highly uniform surface while achieving precise tolerances of a few microns.

BRIEF DESCRIPTION OF THE DRAWINGS

Preferred embodiments of the invention will be described, by way of example, with reference to the accompanying drawings, in which.

DESCRIPTION OF PREFERRED EMBODIMENTS

The invention provides a process for treating a coated substrate to reduce the thickness of the coating by directing a laser beam at a predetermined surface portion of the substrate to remove part of the coating from the predetermined surface portion of the substrate.

The laser machining process of the invention eliminates the need to chemically or mechanically treat coated substrate surfaces. If desired, the laser machining process can be carried out in conjunction with conventional chemical treatments or mechanical polishing processes. The process has potential utility in any commercial process that requires the depth of a polymer coating to be precisely and uniformly reduced. For example, the process can be used to prepare coated electronic circuit boards and other components that require coatings of precise thicknesses, as well as to remove non-uniform areas from many dip or spray coated items, well known problems in the coating industry. If desired, the laser machining process of the invention can be carried out in conjunction with conventional chemical or mechanical treatments well-known in the art.

In a preferred embodiment of the invention, the treated substrate is a coated photoreceptor, such as a belt-type photoreceptor or a dip-coated photoreceptor drum. For purposes of illustration, the laser machining process of the invention will be described with respect to the treatment of a coated cylindrical photoreceptor.

Figure 1:
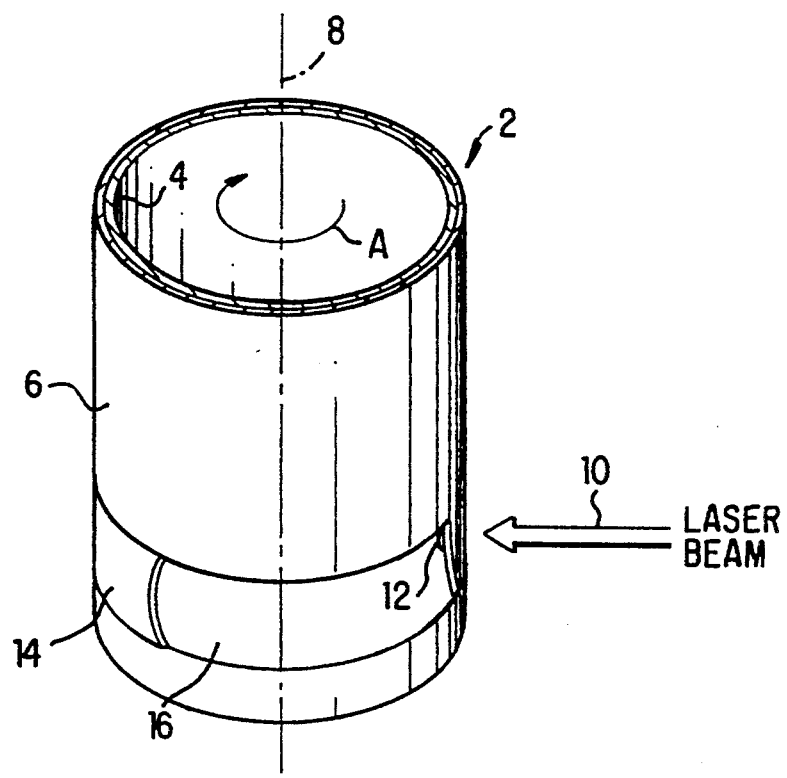
FIG. 1 shows a coated photoreceptor being laser machined according to a process of the present invention.

Referring to FIG. 1, a partially processed photoreceptor drum 2 is shown. Drum 2 includes a rigid cylindrical substrate 4 having an outer coating 6 formed over the substrate. Substrate 4 can be made of any suitable material such as aluminum, nickel, zinc, chromium, conductive paper, stainless steel, cadmium, titanium, metal oxides, polyesters such as MYLAR ®, and the like. Substrate 4 can be formed as one layer or as a plurality of layers, for example as a conductive layer coated over an insulating layer. The thickness of substrate 4 can vary widely depending on the intended use of the photoreceptor, and preferably is from about 65 $\mu$m to about 5 mm thick, preferably from about 0.1 mm to about 1.5 mm.

The invention is useful for treating a variety of coatings, particularly polymer-based coatings. Other coating materials known in the art can be treated according to the invention. Coating 6 can include one or a plurality of layers, and typically in a photoreceptor will include multiple layers such as an electrically conductive ground plane, a blocking layer, an adhesive layer, a charge generating (photogenerating) layer, a charge transporting layer and an overcoat layer. The laser machining process removes part of at least one coating layer at the predetermined surface portion of the photoreceptor. Any desired depth of laser machining, extending through a preselected number of coating layers, can be achieved to precise tolerances using the process of the invention. In addition, the process successfully removes other materials that are contained within the treated coating, such as pigments, adhesives, solvents, binders, and conductive particles of metal oxides and carbon black.

The layers of coating 6 are formed using well-known techniques and materials. For example, coating 6 can be applied to substrate 4 by vacuum deposition, immersion, spray coating, or dip coating. Dip coating or spray coating are preferred. Suitable coating techniques and materials are illustrated in U.S. Pat. Nos. 5,091,278, 5,167,987 and 5,120,628, the entire disclosures of which are incorporated herein by reference. The laser machining process can be carried out in conjunction with the coating process, after the coating has partially hardened. Preferably, laser machining is performed after the coating has substantially or fully hardened.

Coating 6 preferably includes, as a photoconductive material, one or a plurality of layers of selenium, metal alloys, and/or organic resins carrying photoconductive materials. Organic photoconductor coatings are preferred. Such coatings include a photoconductive material such as pigments including dibromoanthanthrone, metal-free and metal phthalocyanines, halogenated metal phthalocyanines, perylenes, and azo pigments, carried in a suitable organic binder resin. Examples of useful organic binder resins include polycarbonates, acrylate polymers, vinyl polymers, cellulose polymers, polysiloxanes, polyamides, polyurethanes, polyesters, and block, random or alternating copolymers thereof.

Drum 2 is preferably mounted such that its axis 8 is vertically oriented. Drum 2 is preferably mounted using a conventional chucking device coupled to a drive (not shown), so that drum 2 can be rotatably driven about axis 8 in the direction of arrow A. Preferably, coated drum 2 is rotated while the laser energy is directed at a predetermined surface portion of coating 6. Drum 2 is preferably oriented such that its axis 8 is approximately perpendicular to the direction of the laser beam impinged upon the surface of the substrate. In this fashion, a circumferential strip 14 of coating 6 is repeatedly exposed to the action of the laser beam. The rotational speed can be selected depending, for example, on the type of coating treated, the power and focal length of the laser, the angle of incidence of the laser beam on the substrate, and the depth of laser machining desired. The rotational speed of the substrate can be maintained constant during the process or it can be varied to further control the effect of the laser beam on the substrate.

Drum 2 is preferably rotated at a speed of from about 50 rpm to about 5000 rpm, but more preferably from about 500 rpm to about 2000 rpm.

As drum 2 is rotated, a laser beam 10 from a conventional $CO_2$ laser (not shown) is directed at a predetermined surface portion of coating 6. Laser beam 10 is preferably provided by a continuous wave $CO_2$ laser. The inventors have found that $CO_2$ lasers provide a laser beam having a wavelength that is particularly well-absorbed by plastic binder resins commonly present in one or more layers of known photoreceptor coatings. A $CO_2$ laser emitting a beam at a wavelength of about 10.6 $\mu$m has been found to work well for organic coatings having polycarbonate binders. The laser beam can have a width equal to the predetermined surface portion to be treated, or it can be narrower. Carbon dioxide continuous wave lasers are commercially available and require no special modification to be effective in carrying out the invention. Alternatively, a pulsed beam $CO_2$ laser, yttrium aluminum garnet (YAG) laser, or excimer laser, among others, could be used to carry out the laser machining process.

The laser should have sufficient power to remove a desired amount of the particular coating treated. The power of the laser can be varied depending on the type of coating treated and the type of substrate. For example, to uniformly reduce the thickness of a polycarbonate coating on a photoreceptor substrate, a $CO_2$ laser having an output of about 800 watts has been found to provide preferred results. The watt density, focal length, focus, and angle of incidence of the laser also affect the machining process, and can be selected to achieve the intended results. A focal length of about 5 inches and a surface focus or slightly off-surface focus are preferred. In the case of cylindrical coated substrates, the laser can be directed at the coating at an angle effective to remove the predetermined portion of coating 6. Laser beam 10 can intersect both coating 6 and substrate 4. However, in the case of a cylindrical coated substrate, laser beam 10 should not be directed along a diameter of the cylinder because this may cause the laser beam to reflect directly back into the laser, possibly damaging the laser.

At a given moment during laser treatment, laser beam 10 impinges on a spot 12 such that part of the coating material in the area of spot 12 is rapidly heated and vaporized by laser beam 10. As drum 2 rotates during the laser machining process, a circumferential strip 14 of coating material 6 substantially the same width as the width of the laser beam is gradually removed. The laser is directed at the predetermined surface portion of coating 6 until the intended amount of coating has been removed.

In a preferred embodiment shown in FIG. 1, the width of laser beam 10 is less than the width of the circumferential strip 14 treated by the process. The laser source is mounted on a carriage (not shown) so as to be movable up and down in a direction parallel to axis 8. To uniformly remove part of the coating, drum 2 is rotated as laser beam 10 impinges on spot 12 near the upper edge of circumferential strip 14. The laser beam is then translated downward to cover the predetermined width of circumferential strip 14. Alternately, laser beam 10 can be translated in the opposite direction from the lower edge of circumferential strip 14 toward the upper edge of the circumferential strip. The translation speed of laser beam 10 can be from about 0.010 inch/second to about 0.10 inch/second, preferably from about 0.030 inch/sec to about 0.80 inch/sec, more preferably from about 0.040 inch/sec to 0.060 inch/sec. Laser beam 10 can be translated across the predetermined surface portion of coating 6 more than once if needed.

Optionally, if laser beam 10 has a width less than the width of circumferential strip 14, laser beam 10 can be rapidly oscillated up and down to cover the desired width of coating 6 to be removed.

The predetermined surface portion of the substrate is preferably purged with an inert gas such as nitrogen gas or helium gas as the laser beam is directed at the substrate. Purging can be carried out using a cross-jet and/or coaxial jet of inert gas directed at the surface of the substrate, or by other means. The coaxial gas pressure can be from about 30 psi to about 150 psi but preferably is from about 70 psi to about 100 psi. The cross-jet pressure can be from about 40 psi to 300 psi but preferably is from about 70 psi to about 120 psi. In the case of the cross-jet, the diameter of the orifice is important and should be from about 0.040 inches to about 0.150 inches, preferably from about 0.070 inches to about 0.120 inches.

When the desired amount of coating has been removed from the predetermined surface portion of coating 6, the laser and nitrogen gas are stopped and drum 2 is removed from the chucking device for further processing or use. A smoothly polished surface 16 is formed extending a predetermined depth into coating 6. The amount of coating removed can be precisely controlled to within a few microns using the process of the invention. The process allows the thickness of a coating to be uniformly reduced in a predetermined region of the coating. The resulting treated coating can have a uniform or variable thickness depending on the intended use of the product.

Preferred uses of the process include reducing the thickness of a seam of the coated photoreceptor, tapering or sealing an edge of the coated photoreceptor, or removing excess material in a sag area of a dip-coated photoreceptor drum by the action of the laser energy on the photoreceptor. These processes were previously carried out in the art by chemical or mechanical means, the need for which are eliminated by the present invention. For example, in the manufacture of certain photoreceptors, such as those including web coatings, the edges of the photoreceptor coating are slit using a rotary knife. This can cause the layers of the photoreceptor coating to begin to delaminate. Treating the edges with a laser beam according to the invention removes part of the coating and fuses the edges of the coating to seal the layers and prevent delamination.

In the case of a seamed belt photoreceptor, the seaming process causes the seam area to be thicker than the total thickness of the belt substrate and coating. Treating the seam to remove the thicker portion of the seam improves the motion quality and blade cleaning capability of the photoreceptor, and reduces the tendency of the seam to crack due to increased stresses.

The sag area on a dip coated photoreceptor is caused when a fluid coating runs or sags due to gravity during the coating process. This causes a greater coating thickness at one end of the photoreceptor. The excess coating thickness can be removed by laser machining the coating according to present invention thereby creating a higher quality photoreceptor.

Figure 3:
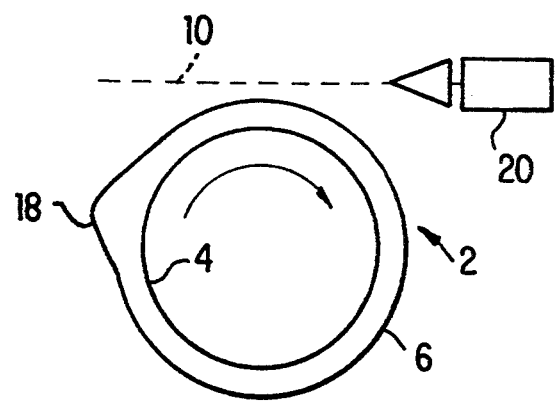
FIG. 3 is a top view of a cylindrical photoreceptor having a non-uniform coating just before being laser machined according to a process of the invention.

FIG. 3 illustrates an exemplary use of the process of the invention to reduce the thickness of a seam or other area of non-uniform thickness in a photoreceptor coating. FIG. 3 shows a top view of a cylindrical photoreceptor drum 2 having a substrate 4 over which is formed a coating 6 of non-uniform thickness. As shown in the drawing, coating 6 has a region 18 of non-uniform thickness due to excess coating material. Photoreceptor drum 2 is shown in a mounted position just before being laser machined by laser beam 10 from laser nozzle 20. In this embodiment, laser beam 10 is positioned at an angle tangential to and just above the outer surface of coating 6.

Figure 4:
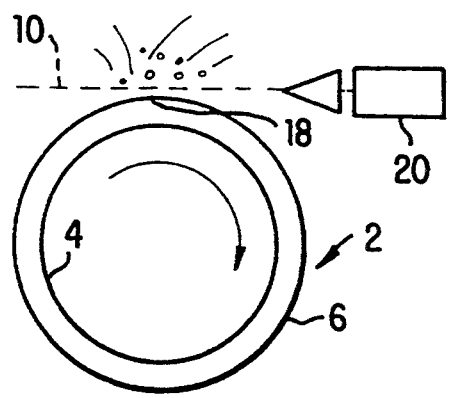
FIG. 4 shows the cylindrical photoreceptor of FIG. 3 as the non-uniform coating is laser machined according to a process of the invention.

FIG. 4 shows the results obtained when photoreceptor drum 2 of FIG. 3 is laser machined by the action of laser beam 10. Laser beam 10 contacts region 18 of coating 6 as region 18 is rotated through the area of traverse of laser beam 10. The area of contact between laser beam 10 and region 18 is purged with nitrogen gas (not shown) during the laser machining process. As illustrated in FIG. 4, the region 18 of excess coating material is ablated and removed by laser beam 10. As a result, the thickness of coating 6 is reduced in region 18 to form a coating 6 of uniform thickness. Although in FIGS. 3 and 4 laser beam 10 only contacts region 18 of coating 6, laser beam 10 could be moved closer to substrate 4 if it is intended to uniformly reduce the thickness of the entire coating 6.

Figure 5:
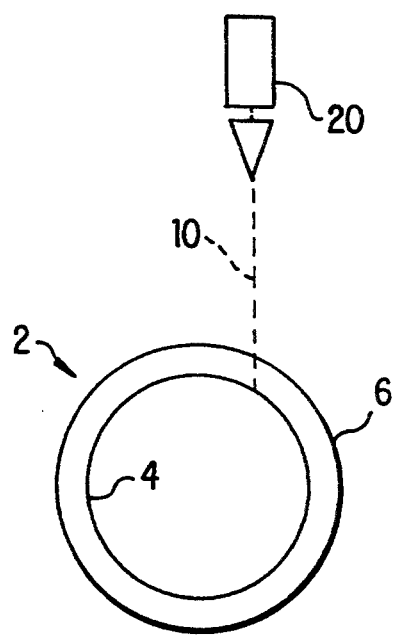
FIG. 5 shows a preferred orientation of the laser beam for carrying out a process of the invention.

FIG. 5 shows a more preferred laser orientation. Laser nozzle 20 is perpendicular to the axis of drum 2 but off-set from the diameter of the drum. In this way, laser beam 10 intersects both coating 6 and substrate 4 without reflecting back into the laser. The action of the laser beam on the coating removes a precisely controllable portion of the coating. The depth of coating removed can be varied by altering the power level of the laser, its watt density and/or the traverse speed of the laser beam. Other factors such as the type of laser, the particular coating treated, and the substrate material and thickness, will affect the amount of coating removed by the process.

Figure 6:
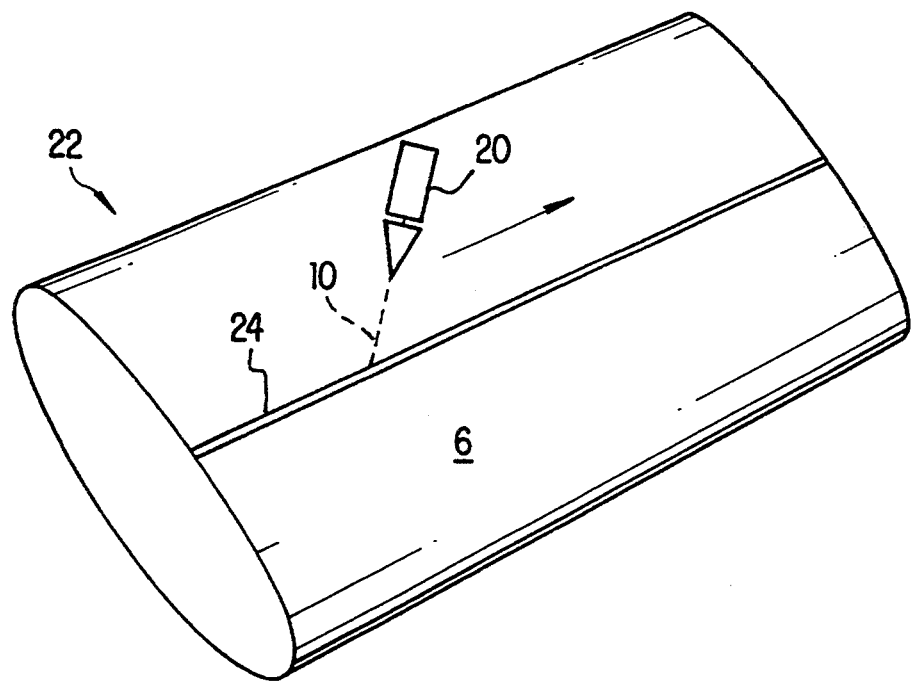
FIG. 6 shows a seamed belt being laser machined according to a process of the invention.
Figure 7:
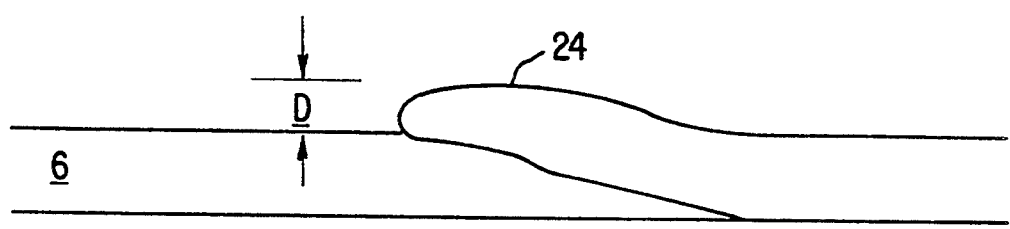
FIG. 7 is an enlarged partial side view of FIG. 5, showing the portion of the seam to be removed by the laser beam.

FIG. 6 shows a seamed photoreceptor belt being laser machined according to the invention. Seamed photoreceptor belt 22 includes a coating 6 having a seam 24 that extends a distance above the surface of the belt. FIG. 7 shows an enlarged partial cross-sectional view of coating 6 having a seam 24 extending a distance D above the coating. Laser nozzle 20 is oriented above seam 24 such that laser beam 10 impinges upon the seam. Laser beam 10 is traversed along seam 24 in the direction of the arrow to remove the excess seam material. Belt 22 is not rotated during this treatment process.

EXAMPLE

Laser Machining a Coated Photoreceptor

The invention will be illustrated with reference to a non-limiting example relating to the laser machining of a coated photoreceptor substrate.

A coated photoreceptor includes an aluminum substrate, a siloxane blocking layer approximately 0.5 $\mu$m thick, a charge generating layer consisting of anthanthrone pigment dispersed in a polymer film forming binder approximately 0.8 $\mu$m thick, and a charge transporting layer consisting of a diamine charge transporting compound dispersed in a polycarbonate film forming binder approximately 20 $\mu$m thick. The photoreceptor is mounted on a chucking device and rotated at 600 rpm. A $CO_2$ continuous wave laser having a power of 800 watts and a focal length of 5 inches is impinged on a predetermined portion of the surface of the photoreceptor at a slightly off-focus setting. The laser nozzle is perpendicular to the axis of the drum but off-set from a line through the center by about 0.250 inches. The distance from the nozzle tip to the drum is approximately 0.200 inches. The laser beam is traversed across the surface of the photoreceptor at a speed of three (3) inches/minute. During the laser machining process, the impinged area is purged with a coaxial jet of nitrogen gas at 80 psi through a tapered copper nozzle and a cross jet of nitrogen through a straight nozzle having a 0.10 inch orifice at a pressure of 90 psi parallel to the axis of the drum.

Figure 2:
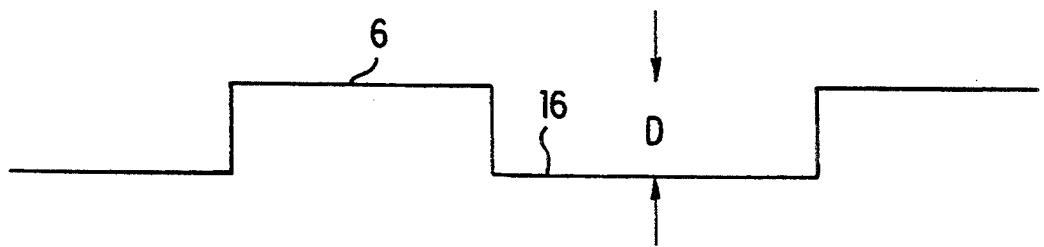
FIG. 2 illustrates a profilometer trace of a portion of the surface of a coated photoreceptor that has been laser machined according to a process of the invention.

The results of the process are shown in the profilometer trace of FIG. 2. The laser machining removes a precise amount of polymer coating from the predetermined surface portion of the photoreceptor. The residual surface 16 appears highly polished and uniform. Residual surface 16 is a distance D, in this example about 20 μm, below an upper surface of the photoreceptor coating 6.

The process is repeated several times with similar results. Precise tolerances are achieved by the laser machining process of the invention. By modifying the power level of the laser, its watt density and/or its traverse speed, precise depth control can be achieved.

The invention enables the treatment of coated substrate surfaces to uniformly remove a portion of the coating in a predetermined region. The process results in a highly polished and uniform surface at tolerances of a few microns. The process obviates chemical or mechanical treatments conventionally used in various commercial processes such as the manufacture of coated photoreceptors.

The foregoing embodiments are intended to illustrate and not limit the invention. It will be apparent that various modifications can be made without departing from the spirit and scope of the invention as defined in the appended claims.

What is claimed is:

1. A process for reducing the thickness of a polymeric photoconductive coating on a photoreceptor, comprising:

directing a laser beam at a surface portion of a polymeric photoconductive coating on a photoreceptor, and maintaining the laser beam on the surface portion for not longer than an amount of time sufficient to remove less than all of the surface portion and the polymeric photoconductive coating underlying the surface portion to provide a photoconductive coating of reduced thickness, wherein the surface portion of the polymeric photoconductive coating is purged with an inert has directed upon the coating as the laser beam is directed at the coating.

2. The process of claim 1, wherein the photoreceptor is rotated while the laser beam is directed at the surface portion of the polymeric photoconductive coating.

3. The process of claim 1, wherein the source of the laser beam is a carbon dioxide continuous wave laser.

4. The process of claim 1, wherein the laser beam is moved along the polymeric photoconductive coating during the removal of the coating from the photoreceptor.

5. The process of claim 1, wherein the inert gas is nitrogen.

6. The process of claim 1, wherein the coating of reduced thickness has a uniform thickness.

7. The process of claim 1, wherein the polymeric photoconductive coating on the photoreceptor is formed by dip coating.

8. The process of claim 1, wherein the coating comprises at least one organic binder resin selected from the group consisting of polycarbonates, acrylate polymers, vinyl polymers, cellulose polymers, polysiloxanes, polyamides, polyurethanes, polyesters, and block, random or alternating copolymers thereof.

9. The process of claim 1 which comprises reducing the thickness of a seam formed in the polymeric photoconductive coating of the photoreceptor by the action of the laser beam on the seam.

10. The process of claim 1 which comprises tapering an edge of the polymeric photoconductive coating on the photoreceptor by the action of the laser beam on the photoreceptor.

11. The process of claim 1, which comprises sealing an edge of the polymeric photoconductive coating on the photoreceptor by the action of the laser beam on the photoreceptor. coating on the photoreceptor by the action of the laser beam on the photoreceptor.

12. The process of claim 1, which comprises removing excess material in a sag area formed in the polymeric photoconductive coating of a dip-coated photoreceptor drum by the action of the laser beam on the photoreceptor.

13. A process for reducing the thickness of a polymeric photoconductive coating on a photoreceptor, comprising rotating a photoreceptor having a polymeric photoconductive coating formed thereon, directing a laser beam from a carbon dioxide continuous wave laser at a surface portion of the polymeric photoconductive coating on the photoreceptor, and moving the laser beam across the photoreceptor to remove part of the coating from the surface portion of the polymeric photoconductive coating, wherein said laser beam is directed at the surface portion for not longer than an amount of time sufficient to remove less than all of the surface portion and the polymeric photoconductive coating underlying the surface portion to form a coating of reduced thickness, and wherein the surface portion of of the polymeric photoconductive coating on the photoreceptor is purged with an inert gas directed upon the coating as the laser beam is directed at the coating.

14. The process of claim 13, wherein the inert gas is nitrogen.

15. The process of claim 13, wherein the coating comprises at least one organic binder resin selected from the group consisting of polycarbonates, acrylate polymers, vinyl polymers, cellulose polymers, polysiloxanes, polyamides, polyurethanes, polyesters, and block, random or alternating copolymers thereof.

16. The process of claim 13, which comprises reducing the thickness of a seam formed in the polymeric photoconductive coating of the photoreceptor by the action of the laser beam on the seam.

17. The process of claim 13, which comprises tapering an edge of the polymeric photoconductive coating on the photoreceptor by the action of the laser beam on the photoreceptor.

18. The process of claim 13, which comprises sealing an edge of the polymeric photoconductive coating on the photoreceptor by the action of the laser beam on the photoreceptor.

19. The process of claim 13, which comprises removing excess material in a sag area formed in the polymeric photoconductive coating of a dip-coated photoreceptor drum by the action of the laser beam on the photoreceptor.

* * * * *